US009519987B1

(12) United States Patent
Kharkar et al.

(10) Patent No.: US 9,519,987 B1
(45) Date of Patent: Dec. 13, 2016

(54) MANAGING CHARACTER CONTROL IN A VIRTUAL SPACE (71) Applicant: Disney Enterprises, Inc., Burbank, CA (US)

(72) Inventors: Sandeep V. Kharkar, Bountiful, UT (US); Jaren J. Peterson, Layton, UT (US); Andrew Cantlay Marre, Montreal (CA)

(73) Assignee: Disney Enterprises, Inc., Burbank, CA (US)

( * ) Notice: Subject to any disclaimer, the term of this patent is extended or adjusted under 35 U.S.C. 154(b) by 535 days.

(21) Appl. No.: 13/621,564

(22) Filed: Sep. 17, 2012

(51) Int. Cl.
G06T 13/00 (2011.01)
G06T 13/40 (2011.01)
G06T 13/20 (2011.01)

(52) U.S. Cl.
CPC .............. G06T 13/40 (2013.01); G06T 13/20 (2013.01)

(58) Field of Classification Search
None
See application file for complete search history.

(56) References Cited

U.S. PATENT DOCUMENTS

| 7,559,834 | B1 * | 7/2009 | York ................................ 463/2 |
| 7,789,741 | B1 * | 9/2010 | Fields ..................... A63F 13/10 463/2 |
| 8,126,985 | B1 * | 2/2012 | Kandekar et al. ............ 709/217 |
| 8,368,721 | B2 * | 2/2013 | McCoy .................... A63F 13/02 345/633 |
| 8,881,030 | B2 * | 11/2014 | Jones et al. .................... 715/757 |
| 2004/0235564 | A1 * | 11/2004 | Booth .............................. 463/31 |
| 2005/0003877 | A1 * | 1/2005 | Cummings ....................... 463/4 |
| 2005/0043097 | A1 * | 2/2005 | March ..................... A63F 13/12 463/42 |
| 2006/0247046 | A1 * | 11/2006 | Choi ....................... A63F 13/12 463/36 |
| 2006/0258445 | A1 * | 11/2006 | Nishimori et al. ............. 463/30 |
| 2007/0155494 | A1 * | 7/2007 | Wells ..................... A63F 13/12 463/35 |
| 2007/0156327 | A1 * | 7/2007 | Tipping .................. A63F 13/10 463/7 |
| 2007/0262999 | A1 * | 11/2007 | Bridger ................... A63F 13/10 345/473 |

(Continued)

Primary Examiner — Anh-Tuan V Nguyen
(74) Attorney, Agent, or Firm — Sheppard Mullin Richter & Hampton LLP (57) ABSTRACT Character control in a virtual space may be managed between user instructions and non-user instructions. User instructions associated with controllable aspects of characters within the virtual space may be received. The characters may include a first character associated with a first user and a second character. Non-user instructions associated with controllable aspects of characters within the virtual space may be provided. A determination may be made as to whether two or more characters are coupled together. The first character may be coupled with the second character responsive to a coupling action performed by one or both of the first character or the second character. A determination may be made as to whether user instructions or non-user instructions should dictate control of controllable aspects of characters. Individual characters may be configured to be agnostic as to whether user instructions or non-user instructions dictate control of controllable aspects.

16 Claims, 2 Drawing Sheets (56) References Cited

U.S. PATENT DOCUMENTS

| | | | |
|---|---|---|---|
| 2009/0104992 A1* | 4/2009 | Kouno | A63F 13/10 463/36 |
| 2009/0259948 A1* | 10/2009 | Hamilton, II | A63F 13/12 715/757 |
| 2009/0275414 A1* | 11/2009 | Lee et al. | 463/42 |
| 2010/0251185 A1* | 9/2010 | Pattenden | A63F 13/10 715/849 |
| 2010/0271367 A1* | 10/2010 | Vaden et al. | 345/420 |
| 2011/0086702 A1* | 4/2011 | Borst | A63F 13/10 463/30 |
| 2011/0165939 A1* | 7/2011 | Borst | A63F 13/12 463/29 |
| 2011/0244954 A1* | 10/2011 | Goldman | A63F 13/65 463/30 |
| 2011/0263324 A1* | 10/2011 | Ganetakos et al. | 463/31 |
| 2011/0319148 A1* | 12/2011 | Kinnebrew et al. | 463/1 |
| 2012/0046105 A1* | 2/2012 | Yamaguchi et al. | 463/37 |
| 2012/0052950 A1* | 3/2012 | Kataoka et al. | 463/36 |
| 2012/0064973 A1* | 3/2012 | Bechtel | G06F 3/016 463/37 |
| 2012/0129597 A1* | 5/2012 | Baszucki | 463/31 |
| 2012/0157198 A1* | 6/2012 | Latta et al. | 463/31 |
| 2012/0231889 A1* | 9/2012 | Lee | A63F 13/12 463/42 |
| 2013/0267330 A1* | 10/2013 | Suzuki et al. | 463/43 |

* cited by examiner

MANAGING CHARACTER CONTROL IN A VIRTUAL SPACE

FIELD OF THE DISCLOSURE

This disclosure relates to managing control of one or more controllable aspects of characters in a virtual space between user instructions and non-user instructions.

BACKGROUND

Conventionally, in a multi-character networked game, a character may be controlled by multiple methods, which can change based on a current state of the game. For example, a user-controlled character may be controlled by a user's input from a controller or keyboard on the local machine, but may be controlled by some network interface on a remote machine. To illustrate, a rideable character, when it is not being ridden, may be controlled by an artificial intelligence behavior tree or state machine on a local machine and by some network interface on a remote machine. Once the user-controlled character mounts the rideable character, it may be controlled by the user's controller input on the local machine and still by a network interface on a remote machine. This may be further complicated if a user-controlled character on the remote machine mounts the rideable character that was on a network interface because the rideable character may need to change from network controlled to user controlled on the remote machine and from AI controlled to network controlled on the master machine.

Existing solutions may require hard coding on a case-by-case basis. Non-user-controlled characters may be developed separate from user-controlled characters such that little to no functionality is shared. User-controlled characters may not easily transition to being controlled by other sources. If such functionality is required, explicit coding for a specific character may be necessary. Networking may be implemented in a very literal manner with large amounts of network traffic being dedicated to updating where a character is located and what animations are being played on the character. The network implementation of characters may require extrapolating to make educated guesses about where the master character is at a given moment and what animation is playing at what frame. As such, existing approaches may be very inflexible and unforgiving making for very choppy looking characters on the network.

SUMMARY

One aspect of the disclosure relates to a system configured to manage character control in a virtual space between user instructions and non-user instructions. Exemplary implementations may unify character control sources by "turning on and off" different control input streams based on which type of control the character is using at a given moment. These control input streams may include user instructions and non-user instructions. The non-user instructions may be provided from one or more of artificial intelligence, network resources, testing resources, and/or other sources. Character behavior may be based on a common instruction set and the various control input streams may provide the same or similar instructions. In some implementations, specific function names may be prefixed with keywords for individual control input streams to specialize decision making for the relevant input stream. Some implementations may use basic functions without prefixed keywords to allow for common decision making to be scripted once and shared for all control input streams.

In exemplary implementations, individual characters may be quickly and easily made networked because the only changes required may be those specific to the networked mode of operations—the rest of the character implementation may not change. Characters may be easily migrated to different stations in a network game by merely switching the input streams that drive them on each station. A typically-user-controlled character may be easily updated to be controlled by artificial intelligence, network resources, and/or testing resources. Similarly, a typically-non-user-controlled character may be easily updated to be controlled by a user. Multiple characters may share a control input stream (e.g., from a single controller device) making composite characters easily implemented.

In some implementations, the system may include one or more servers. The server(s) may be configured to communicate with one or more client computing platforms according to a client/server architecture. The users may access the system and/or the virtual space via client computing platform(s). The server(s) may be configured to execute one or more computer program modules. The computer program modules may include one or more of a user module, a space module, a user control input module, a non-user control input module, a coupling detection module, a control source module, and/or other modules. The user module may be configured to access and/or manage one or more user profiles and/or user information associated with users of the system. The space module may be configured to implement the instance of the virtual space executed by the computer modules to determine views of the virtual space.

As used herein, the term "character" may refer to an object (or group of objects) present in the virtual space that represents an individual user, is controlled by an individual user, and/or is controlled by another source such as artificial intelligence, network resources, testing resources, and/or other sources. In some implementations, various aspects of a character may be controlled by different sources. For example, for a given character, one controllable aspect may be controlled by a first user, another controllable aspect may be controlled by a second user, and yet another controllable aspect may be controlled by artificial intelligence. Controllable aspects of a given character may include one or more of locomotion of the given character, a gesture performable by the given character, a field of view of the given character, a bodily motion of the given character, actions performable by the given character, equipping the given character with a tool and/or weapon, using an equipped tool and/or weapon, initiating an interaction (e.g., coupling) between the given character and another character, playing audio and/or visual effects associated with an action performed by the given character, and/or other controllable aspects. To illustrate, direction of travel of a vehicle carrying two user characters may be controlled by a first user, a weapon mounted on the vehicle may be controlled by the second user, and reactions to terrain may be controlled by artificial intelligence.

The user control input module may be configured to receive user instructions associated with one or more controllable aspects of one or more characters within the virtual space. The user instructions may be received from users via client computing platform(s). The user instructions may include commands, directives, and/or other information usable by the space module to control one or more controllable aspects of one or more characters.

The non-user control input module may be configured to provide non-user instructions associated with one or more controllable aspects of one or more characters within the virtual space. The non-user instructions may be provided via one or more of artificial intelligence, network resources, testing resources, a peripheral device (e.g., a cameras or switch), non-system input (e.g., a door opening or closing, people entering or exiting the room, people walking up or down stairs), and/or other non-user sources. The non-user instructions may include commands, directives, and/or other information usable by the space module to control one or more controllable aspects of one or more characters.

The coupling detection module may be configured to determine whether two or more characters are coupled together. A first character may be coupled with a second character responsive to a coupling action performed by one or both of the first character or the second character. Examples of coupling actions may include one or more of the first character coming into proximity with the second character, the first character entering the second character (e.g., entering a car character), the first character mounting the second character (e.g., mounting a horse character), the first character interacting in a given manner with the second character, interacting with a building (e.g., entering a building, opening or closing a door of a building), moving an object (e.g., one character using a tool to cause another character to be displaced), and/or other coupling actions. In some implementations, a coupling action may include the first character being picked up and carried by the second character.

While the first character and the second character are coupled together, the first character may be decoupled from the second character responsive to a decoupling action performed by one or both of the first character or the second character. Decoupling actions may include one or more of the first character leaving the proximity of the second character, the first character exiting the second character, the first character dismounting the second character, exiting a building, dropping a carried character, placing a character that is being moved, and/or other decoupling actions.

The first user character may be associated with a first user. In some implementations, the second character may be associated with a first user responsive to the first user character being coupled with the second character. The second character may be disassociated with the first user responsive to the first user character being decoupled from the second character. The second character may not be associated with any user when the second character is not coupled with another character.

In some implementations, a third character may be coupled with the first character and the second character. The third character may be associated with the first user responsive to the first character being coupled in a first manner with the third character. For example, if the third character is a car, and the first character is positioned in the driver's seat and the second character is positioned in the passenger's seat, the third character may be associated with the first user.

The control source module may be configured to determine whether user instructions or non-user instructions should dictate control of controllable aspects of characters. Individual characters may be configured to be agnostic as to whether user instructions or non-user instructions dictate control of controllable aspects. That is, a given character may receive instructions dictating control of controllable aspects, but the source may be indistinguishable or inconsequential from the character's perspective. The determination as to whether user instructions or non-user instructions dictate control of one or more controllable aspects of the second character may be based on whether the first character is coupled with the second character. By way of non-limiting example, responsive to a first character (e.g., an avatar) mounting a second character that is rideable (e.g., a horse), one or more controllable aspects of the second character may switch from being controlled by non-user instructions to being controlled by user instructions.

In some implementations, the control source module may be configured to determine whether a given controllable aspect of a given character is disabled such that neither user instructions nor non-user instructions are used to control the given controllable aspect. For example, a given character may be able to perform a specific action only when the given character is coupled with another character, otherwise, that specific action may be disabled.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
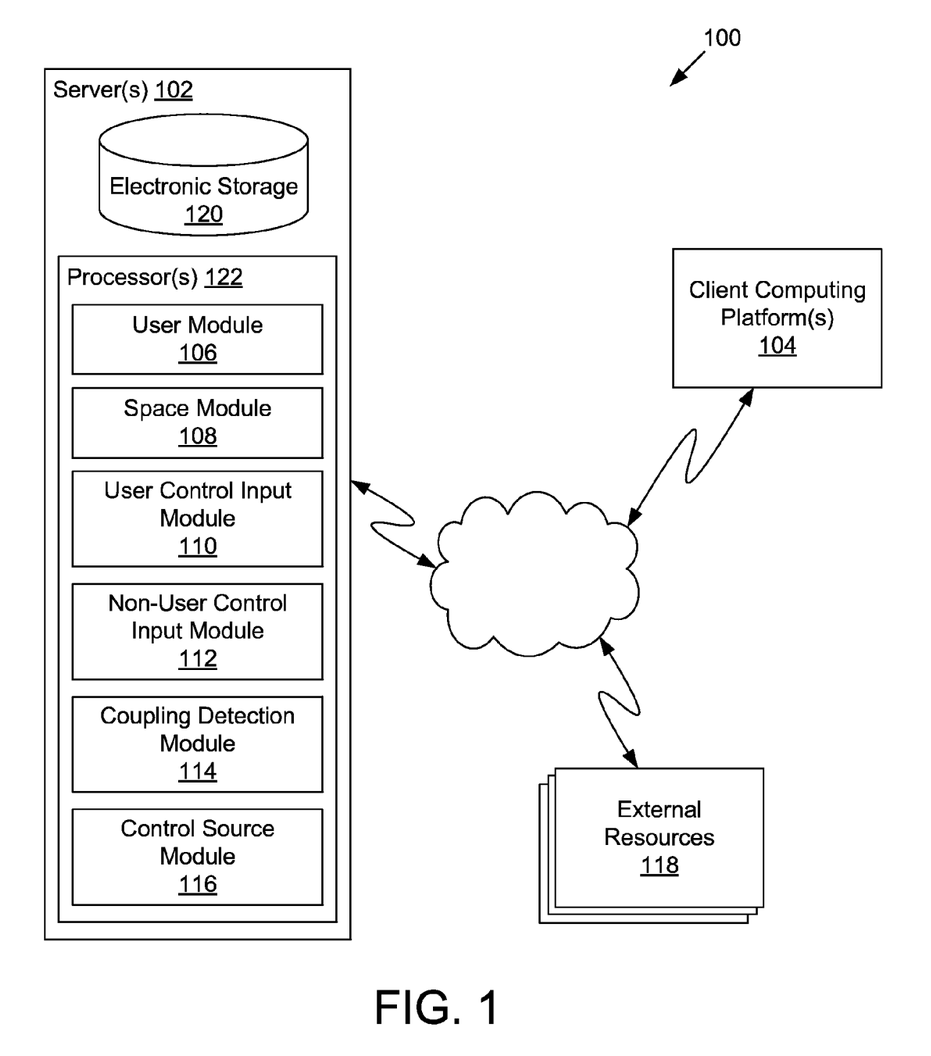
FIG. 1 illustrates a system configured to manage character control in a virtual space between user instructions and non-user instructions, in accordance with one or more implementations.

FIG. 1 illustrates a system 100 configured to manage character control in a virtual space between user instructions and non-user instructions, in accordance with one or more implementations. In some implementations, system 100 may include one or more servers 102. The server(s) 102 may be configured to communicate with one or more client computing platforms 104 according to a client/server architecture. In some implementations, two or more client computing platforms 104 may communication with each other according to a peer-to-peer architecture. The users may access system 100 and/or the virtual space via client computing platform(s) 104. The server(s) 102 may be configured to execute one or more computer program modules. The computer program modules may include one or more of a user module 106, a space module 108, a user control input module 110, a non-user control input module 112, a coupling detection module 114, a control source module 116, and/or other modules.

The user module 106 may be configured to access and/or manage one or more user profiles and/or user information associated with users of system 100. The one or more user profiles and/or user information may include information stored by server(s) 102, client computing platform(s) 104, and/or other storage locations. The user profiles may include, for example, information identifying users (e.g., a username or handle, a number, an identifier, and/or other identifying information) within the virtual space, security login information (e.g., a login code or password), virtual space account information, subscription information, virtual currency account information (e.g., related to currency held in credit for a user), relationship information (e.g., information related to relationships between users in the virtual space), virtual space usage information, demographic information associated with users, interaction history among users in the virtual space, information stated by users, purchase information of users, browsing history of users, a client computing platform identification associated with a user, a phone number associated with a user, and/or other information related to users.

The space module 108 may be configured to implement the instance of the virtual space executed by the computer modules to determine views of the virtual space. The views may then be communicated (e.g., via streaming, via object/position data, and/or other information) from server(s) 102 to client computing platform(s) 104 for presentation to users. The view determined and transmitted to a given client computing platform 104 may correspond to a user character being controlled by a user via the given client computing platform 104. The view determined and transmitted to a given client computing platform 104 may correspond to a location in the virtual space (e.g., the location from which the view is taken, the location the view depicts, and/or other locations), a zoom ratio, a dimensionality of objects, a point-of-view, and/or view parameters. One or more of the view parameters may be selectable by the user.

The instance of the virtual space may comprise a simulated space that is accessible by users via clients (e.g., client computing platform(s) 104) that present the views of the virtual space to a user. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

The above description of the manner in which views of the virtual space are determined by space module 108 is not intended to be limiting. The space module 108 may be configured to express the virtual space in a more limited, or richer, manner. For example, views determined for the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Within the instance(s) of the virtual space executed by space module 108, users may control characters, objects, simulated physical phenomena (e.g., wind, rain, earthquakes, and/or other phenomena), and/or other elements within the virtual space to interact with the virtual space and/or each other. The user controlled element(s) may move through and interact with the virtual space (e.g., non-user characters in the virtual space, other objects in the virtual space). The user controlled elements controlled by and/or associated with a given user may be created and/or customized by the given user. The user may have an "inventory" of virtual goods and/or currency that the user can use (e.g., by manipulation of a user character or other user controlled element, and/or other items) within the virtual space.

As used herein, the term "character" may refer to an object (or group of objects) present in the virtual space that represents an individual user, is controlled by an individual user, and/or is controlled by another source such as artificial intelligence, network resources, testing resources, and/or other sources. The user characters may include avatars. A given character associated with a given user may be controlled by the given user with which it is associated. In some implementations, a given character may be associated with only one user at a time. In some implementation, a character may be associated with two or more users such that each associated user can control different controllable aspects of the given character.

In some implementations, various aspects of a character may be controlled by different sources. For example, for a given character, one controllable aspect may be controlled by a first user, another controllable aspect may be controlled by a second user, and yet another controllable aspect may be controlled by artificial intelligence. Controllable aspects of a given character may include one or more of locomotion of the given character, a gesture performable by the given character, a field of view of the given character, a bodily motion of the given character, actions performable by the given character, equipping the given character with a tool and/or weapon, using an equipped tool and/or weapon, initiating an interaction (e.g., coupling) between the given character and another character, playing audio and/or visual effects associated with an action performed by the given character—and/or other controllable aspects. To illustrate, direction of travel of a vehicle carrying two user characters may be controlled by a first user, a weapon mounted on the vehicle may be controlled by the second user, and reactions to terrain may be controlled by artificial intelligence.

The users may participate in the instance of the virtual space by controlling one or more of the available user controlled elements in the virtual space. Control may be exercised through control inputs and/or commands input by the users through client computing platform(s) 104. The users may interact with each other through communications exchanged within the virtual space. Such communications may include one or more of textual chat, instant messages, private messages, voice communications, and/or other communications. Communications may be received and entered by the users via their respective client computing platform(s) 104. Communications may be routed to and from the appropriate users through server(s) 102 (e.g., through space module 108).

The user control input module 110 may be configured to receive user instructions associated with one or more controllable aspects of one or more characters within the virtual space. The user instructions may be received from users via client computing platform(s) 104. The user instructions may include commands, directives, and/or other information usable by space module 108 to control one or more controllable aspects of one or more characters.

The non-user control input module 112 may be configured to provide non-user instructions associated with one or more controllable aspects of one or more characters within the virtual space. The non-user instructions may be provided via one or more of artificial intelligence, network resources, testing resources, a peripheral device (e.g., a cameras or switch), non-system input (e.g., a door opening or closing, people entering or exiting the room, people walking up or down stairs)—and/or other non-user sources. The non-user instructions may include commands, directives, and/or other information usable by space module 108 to control one or more controllable aspects of one or more characters.

The coupling detection module 114 may be configured to determine whether two or more characters are coupled together. A first character may be coupled with a second character responsive to a coupling action performed by one or both of the first character or the second character. Examples of coupling actions may include one or more of the first character coming into proximity with the second character, the first character entering the second character (e.g., entering a car character), the first character mounting the second character (e.g., mounting a horse character), the first character interacting in a given manner with the second character, interacting with a building (e.g., entering a building, opening or closing a door of a building), moving an object (e.g., one character using a tool to cause another character to be displaced), and/or other coupling actions. In some implementations, a coupling action may include the first character being picked up and carried by the second character.

While the first character and the second character are coupled together, the first character may be decoupled from the second character responsive to a decoupling action performed by one or both of the first character or the second character. Decoupling actions may include one or more of the first character leaving the proximity of the second character, the first character exiting the second character, the first character dismounting the second character, exiting a building, dropping a carried character, placing a character that is being moved, and/or other decoupling actions.

The first user character may be associated with a first user. In some implementations, the second character may be associated with a first user responsive to the first user character being coupled with the second character. The second character may be disassociated with the first user responsive to the first user character being decoupled from the second character. The second character may not be associated with any user when the second character is not coupled with another character.

In some implementations, a third character may be coupled with the first character and the second character. The third character may be associated with the first user responsive to the first character being coupled in a first manner with the third character. For example, if the third character is a car, and the first character is positioned in the driver's seat and the second character is positioned in the passenger's seat, the third character may be associated with the first user. As another example of three characters being coupled, where two characters are bipeds, the first character may be carrying the second character who is, in turn, carrying the third character such that the three characters are coupled. As yet another example of three characters being coupled, where two characters are bipeds and the third is a mount (e.g., a horse), the first character may be carrying the second character and also riding on the third character such that the three characters are coupled.

The control source module 116 may be configured to determine whether user instructions or non-user instructions should dictate control of controllable aspects of characters. Individual characters may be configured to be agnostic as to whether user instructions or non-user instructions dictate control of controllable aspects. That is, a given character may receive instructions dictating control of controllable aspects, but the source may be indistinguishable or inconsequential from the character's perspective. The determination as to whether user instructions or non-user instructions dictate control of one or more controllable aspects of the second character may be based on whether the first character is coupled with the second character. By way of non-limiting example, responsive to a first character (e.g., an avatar) mounting a second character that is rideable (e.g., a horse), one or more controllable aspects of the second character may switch from being controlled by non-user instructions to being controlled by user instructions.

In some implementations, control source module 116 may be configured to determine whether a given controllable aspect of a given character is disabled such that neither user instructions nor non-user instructions are used to control the given controllable aspect. For example, a given character may be able to perform a specific action only when the given character is coupled with another character, otherwise, that specific action may be disabled. In some implementations, one of the characters in a coupling may not be able to perform a specific action while coupled. For example, a character that is being carried may be move themselves and/or initiate an interaction (e.g., coupling) with a third character to ride the third character.

In some implementations, server(s) 102, client computing platform(s) 104, and/or external resources 118 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, client computing platform(s) 104, and/or external resources 118 may be operatively linked via some other communication media.

A given client computing platform 104 may include one or more processors configured to execute computer program modules. The computer program modules may be configured to enable an expert or user associated with the given client computing platform 104 to interface with system 100 and/or external resources 118, and/or provide other functionality attributed herein to client computing platform(s) 104. By way of non-limiting example, the given client computing platform 104 may include one or more of a desktop computer, a laptop computer, a handheld computer, a NetBook, a Smartphone, a gaming console, and/or other computing platforms.

The external resources 118 may include sources of information, hosts and/or providers of virtual environments outside of system 100, external entities participating with system 100, and/or other resources. In some implementations, some or all of the functionality attributed herein to external resources 118 may be provided by resources included in system 100.

The server(s) 102 may include electronic storage 120, one or more processors 122, and/or other components. The server(s) 102 may include communication lines, or ports to enable the exchange of information with a network and/or other computing platforms. Illustration of server(s) 102 in FIG. 1 is not intended to be limiting. The server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 120 may comprise electronic storage media that electronically stores information. The electronic storage media of electronic storage 120 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 122, information received from server(s) 102, information received from client computing platform(s) 104, and/or other information that enables server(s) 104 to function as described herein.

Processor(s) 122 may be configured to provide information processing capabilities in server(s) 102. As such, processor(s) 122 may include one or more of a digital processor, an analog processor, a digital circuit designed to process information, an analog circuit designed to process information, a state machine, and/or other mechanisms for electronically processing information. Although processor(s) 122 is shown in FIG. 1 as a single entity, this is for illustrative purposes only. In some implementations, processor(s) 122 may include a plurality of processing units. These processing units may be physically located within the same device, or processor(s) 122 may represent processing functionality of a plurality of devices operating in coordination. The processor(s) 122 may be configured to execute modules 106, 108, 110, 112, 114, 116, and/or other modules. Processor xx may be configured to execute modules 106, 108, 110, 112, 114, 116, and/or other modules by software; hardware; firmware; some combination of software, hardware, and/or firmware; and/or other mechanisms for configuring processing capabilities on processor(s) 122.

It should be appreciated that although modules 106, 108, 110, 112, 114, and 116 are illustrated in FIG. 1 as being co-located within a single processing unit, in implementations in which processor(s) 122 includes multiple processing units, one or more of modules 106, 108, 110, 112, 114, and/or 116 may be located remotely from the other modules. The description of the functionality provided by the different modules 106, 108, 110, 112, 114, and/or 116 described below is for illustrative purposes, and is not intended to be limiting, as any of modules 106, 108, 110, 112, 114, and/or 116 may provide more or less functionality than is described. For example, one or more of modules 106, 108, 110, 112, 114, and/or 116 may be eliminated, and some or all of its functionality may be provided by other ones of modules 106, 108, 110, 112, 114, and/or 116. As another example, processor xx may be configured to execute one or more additional modules that may perform some or all of the functionality attributed herein to one of modules 106, 108, 110, 112, 114, and/or 116.

Figure 2:
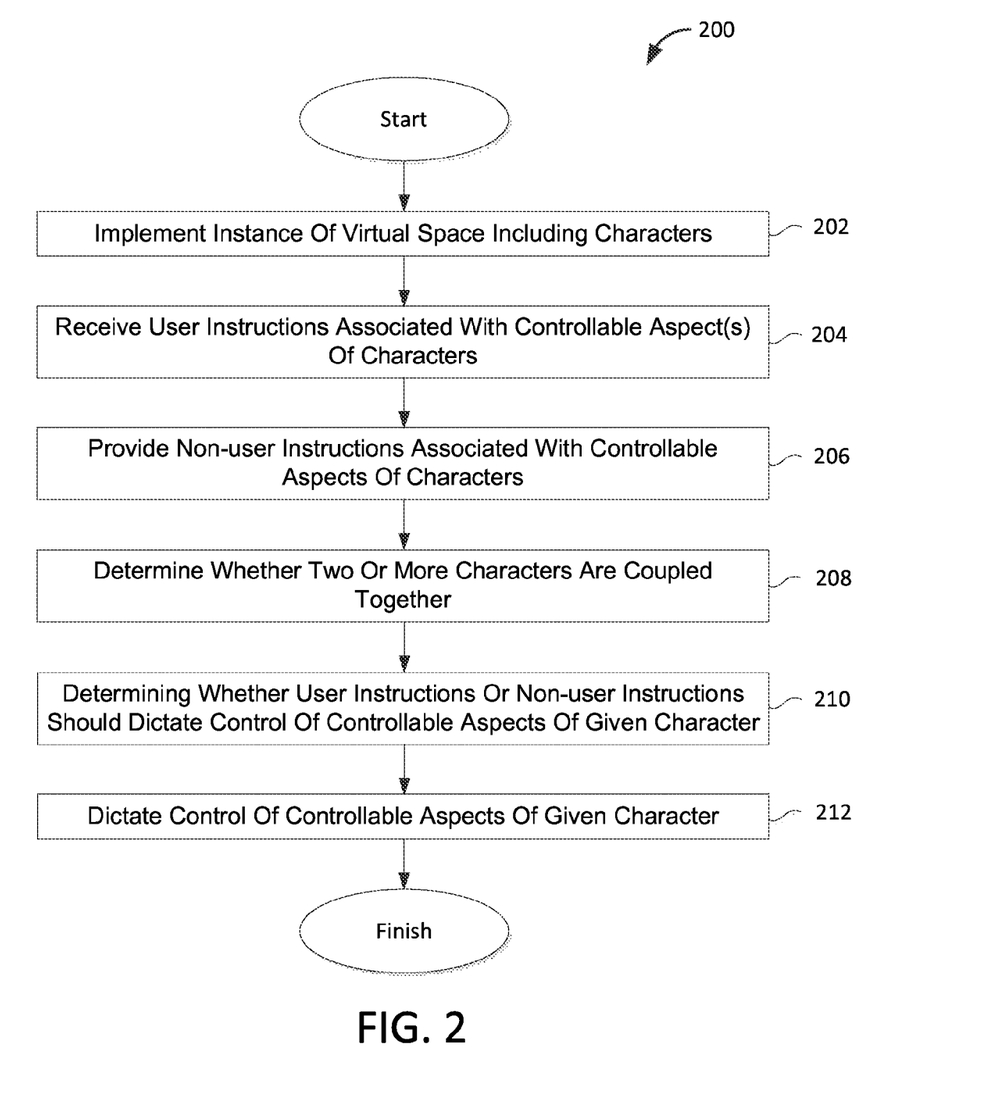
FIG. 2 illustrates a method for managing character control in a virtual space between user instructions and non-user instructions, in accordance with one or more implementations.

FIG. 2 illustrates a method 200 for managing character control in a virtual space between user instructions and non-user instructions, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

At an operation 202, an instance of the virtual space may be implemented. The instance of the virtual space may include characters configured to be agnostic as to whether user instructions or non-user instructions dictate control of controllable aspects of the characters. The characters may include a first character associated with a first user and a second character. Operation 202 may be performed by a space module that is the same as or similar to space module 108, in accordance with one or more implementations.

At an operation 204, user instructions associated with one or more controllable aspects of the characters may be received. Operation 204 may be performed by a user control input module that is the same as or similar to user control input module 110, in accordance with one or more implementations.

At an operation 206, non-user instructions associated with one or more controllable aspects of the characters may be provided. Operation 206 may be performed by a non-user control input module that is the same as or similar to non-user control input module 112, in accordance with one or more implementations.

At an operation 208, a determination may be made as to whether two or more characters are coupled together. The first character may be coupled with the second character responsive to a coupling action performed by one or both of the first character or the second character. Operation 208 may be performed by a coupling detection module that is the same as or similar to coupling detection module 114, in accordance with one or more implementations.

At an operation 210, a determination may be made as to whether user instructions or non-user instructions should dictate control of controllable aspects of characters. The determination as to whether user instructions or non-user instructions dictate control of one or more controllable aspects of the second character may be based on whether the first character is coupled with the second character. Operation 210 may be performed by a control source module that is the same as or similar to control source module 116, in accordance with one or more implementations.

At an operation 212, control of the one or more controllable aspects of the second character may be dictated based on the determination as to whether user instructions or non-user instructions dictate control of one or more controllable aspects of the second character. Operation 212 may be performed by a space module that is the same as or similar to space module 108, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to manage character control in a virtual space between user instructions and non-user instructions, the system comprising:
    one or more physical processors configured by machine-readable instructions to:
        implement an instance of the virtual space to determine views of the virtual space, the instance of the virtual space including characters configured to be agnostic as to whether user instructions or non-user instructions dictate control of controllable aspects of the characters, the characters including a first character associated with a first user and a second character;
        receive user instructions associated with direct user control of one or more controllable aspects of the characters, one or more controllable aspects of the first character being directly controlled by the user instructions;
        provide non-user instructions associated with control of one or more controllable aspects of the characters, the non-user instructions being uninfluenced by the user instructions;
        determine whether two or more characters are coupled together within the instance of the virtual space, the first character being coupled with the second character responsive to a coupling action performed by one or both of the first character or the second character within the instance of the virtual space;
        determine whether user instructions or non-user instructions should dictate control of controllable aspects of characters, the determination as to whether user instructions or non-user instructions dictate control of one or more controllable aspects of the second character being based on whether the first character is coupled with the second character; and
        dictate control of the one or more controllable aspects of the second character such that (1) the one or more controllable aspects of the second character are directly user-controlled by user instructions responsive to a determination that the first character is coupled with the second character based on performance of the coupling action by one or both of the first character or the second character and (2) the one or more controllable aspects of the second character are controlled by non-user instructions responsive to a determination that the first character is not coupled with the second character based on neither the first character nor the second character performing the coupling action.

2. The system of claim 1, wherein the one or more controllable aspects of a given character include one or more of locomotion of the given character, a gesture performable by the given character, a field of view of the given character, a bodily motion of the given character, or actions performable by the given character.

3. The system of claim 1, wherein the second character is associated with a second user.

4. The system of claim 1, wherein:
    the second character is associated with the first user responsive to the first character being coupled with the second character; and
    the second character is disassociated with the first user responsive to the first character being decoupled from the second character.

5. The system of claim 1, wherein the characters include a third character, the third character being coupled with the first character and the second character, the third character being associated with the first user responsive to the first character being coupled in a first manner with the third character.

6. The system of claim 1, wherein the non-user instructions are provided via one or more of artificial intelligence, network resources, or testing resources.

7. The system of claim 1, wherein the coupling action includes one or more of the first character coming into proximity with the second character, the first character entering the second character, the first character mounting the second character, or the first character interacting in a given manner with the second character.

8. The system of claim 1, wherein the one or more physical processors are further configured by machine-readable instructions to determine whether a given controllable aspect of a given character is disabled such that neither user instructions nor non-user instructions are used to control the given controllable aspect.

9. A computer-implemented method for managing character control in a virtual space between user instructions and non-user instructions, the method being performed by one or more processors configured by machine-readable instructions, the method comprising:
    implementing an instance of the virtual space to determine views of the virtual space, the instance of the virtual space including characters configured to be agnostic as to whether user instructions or non-user instructions dictate control of controllable aspects of the characters, the characters including a first character associated with a first user and a second character;
    receiving user instructions associated with direct user control of one or more controllable aspects of the characters, one or more controllable aspects of the first character being directly controlled by the user instructions;
    providing non-user instructions associated with control of one or more controllable aspects of the characters, the non-user instructions being uninfluenced by the user instructions;
    determining whether two or more characters are coupled together within the instance of the virtual space, the first character being coupled with the second character responsive to a coupling action performed by one or both of the first character or the second character within the instance of the virtual space;
    determining whether user instructions or non-user instructions should dictate control of controllable aspects of characters, the determination as to whether user instructions or non-user instructions dictate control of one or more controllable aspects of the second character being based on whether the first character is coupled with the second character; and dictating control of the one or more controllable aspects of the second character such that (1) the one or more controllable aspects of the second character are directly user-controlled by user instructions responsive to a determination that the first character is coupled with the second character based on performance of the coupling action by one or both of the first character or the second character and (2) the one or more controllable aspects of the second character are controlled by non-user instructions responsive to a determination that the first character is not coupled with the second character based on neither the first character nor the second character performing the coupling action.

10. The method of claim 9, wherein the one or more controllable aspects of a given character include one or more of locomotion of the given character, a gesture performable by the given character, a field of view of the given character, a bodily motion of the given character, or actions performable by the given character.

11. The method of claim 9, wherein the second character is associated with a second user.

12. The method of claim 9, wherein:
the second character is associated with the first user responsive to the first character being coupled with the second character; and
the second character is disassociated with the first user responsive to the first character being decoupled from the second character.

13. The method of claim 9, wherein the characters include a third character, the third character being coupled with the first character and the second character, the third character being associated with the first user responsive to the first character being coupled in a first manner with the third character.

14. The method of claim 9, wherein the non-user instructions are provided via one or more of artificial intelligence, network resources, or testing resources.

15. The method of claim 9, wherein the coupling action includes one or more of the first character coming into proximity with the second character, the first character entering the second character, the first character mounting the second character, or the first character interacting in a given manner with the second character.

16. The method of claim 9, further comprising determining whether a given controllable aspect of a given character is disabled such that neither user instructions nor non-user instructions are used to control the given controllable aspect.

* * * * *